May 30, 1933.  J. G. SWAIN  1,911,593
WHEEL
Filed Jan. 22, 1929
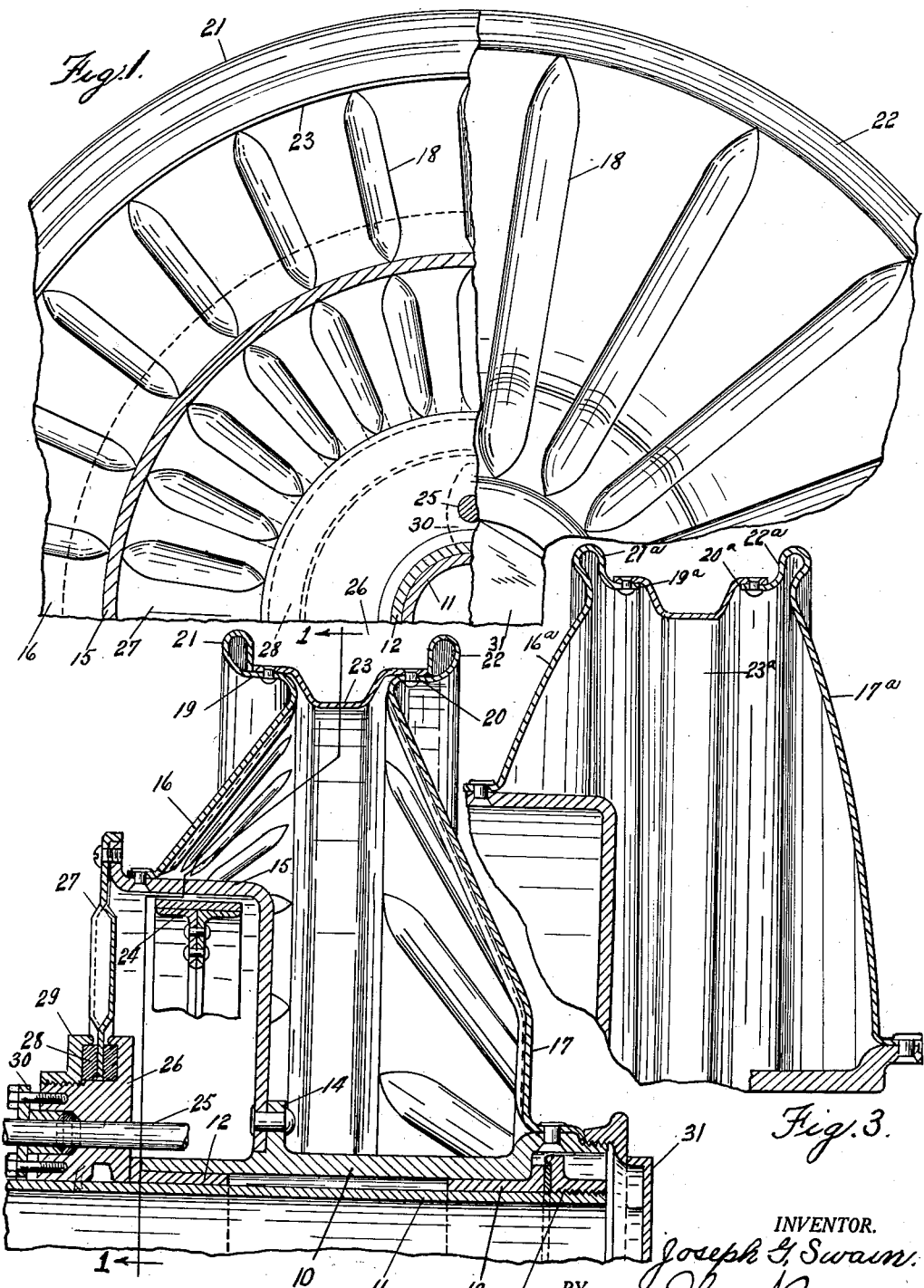
INVENTOR.
Joseph G. Swain,
BY
Ely & Barrow
ATTORNEYS.

Patented May 30, 1933

1,911,593

UNITED STATES PATENT OFFICE

JOSEPH G. SWAIN, OF AKRON, OHIO, ASSIGNOR TO THE FIRESTONE STEEL PRODUCTS COMPANY, OF AKRON, OHIO, A CORPORATION OF OHIO

WHEEL

Application filed January 22, 1929. Serial No. 334,215.

This invention relates to wheels and particularly to the double disk type of airplane wheels constructed with a nondetachable tire seating rim and a built-in brake drum comprising a portion of the inner disk.

In the manufacture of airplane wheels it is desirable to employ duralumin in order to obtain lightness as well as strength. This material, however, has manufacturing disadvantages in that it cannot be successfully welded and cannot be rolled to provide flaring flanges or the like such as are formed on pneumatic tire rims without danger of splitting. Duralumin can, however, be successfully stamped from flat sheets and it is the general purpose of this invention to provide a wheel construction with an integral rim portion capable of simple manufacture and eliminating the welding of rim ends and the rolling of annular flanges on a cylindrical rim.

An object of the invention is to devise a double disk wheel formed with peripheral flanges for mounting a tire with its bead portions directly supported on the flanges. A further object is to devise a double disk wheel with the peripheral portions of the disks forming the tire rim flanges and a rim base cooperating with said flanges to provide a drop center rim for a tire mounted on the wheel. Another object is to devise a double disk wheel with the peripheral portions of the disks affording tire mounting seats and an annular member serving as a spacer between the two disks and also as a base for a drop center rim.

Still another object is to devise a waterproof brake construction whereby the internal portions of the brake may be protected from moisture.

The foregoing and other objects are obtained by the device illustrated in the accompanying drawing and described below. It is to be understood that the device is not limited to the specific form thereof disclosed herein.

Of the accompanying drawing,

Figure 1 is a fragmental side elevation of a wheel embodying the principles of the invention, a portion of the view being in section taken on the line 1—1 of Figure 2;

Figure 2 is a transverse vertical section through the upper half of the wheel; and Figure 3 is a detailed section of a modified form of the invention.

Referring to the drawing, the numeral 10 denotes a hub journaled upon a fixed axle 11, bearing bushings 12, 12 being interposed therebetween and the hub being maintained on the axle by a nut 13. The hub is formed with a flange 14 to which is riveted brake drum 15, the latter having in turn attached thereto the inside disk 16 of the wheel, while the outer disk 17 of the wheel is riveted to the outer end of the hub. The disks may be generally conical in shape as illustrated in Figure 2, in which case they are provided with corrugations 18 for stiffening the same, or may be dished out in the concave, convex shape illustrated in Figure 3.

In the form shown in Figure 2 the peripheral margins of the disks are formed with cylindrical seating flanges 19 and 20 with the extreme margins of the disks stamped or spun to form tire rim flanges 21 and 22. Channeled annular member 23 is riveted to the disks at flange portions 19 and 20 and cooperates with flanges 21 and 22 as the base of a non-detachable drop center rim supporting the tire (not shown).

In the modified form of the invention illustrated in Figure 3 the peripheral portions of the disks 16ª and 17ª are stamped to form flanges 21ª and 22ª, the extreme margins of the disks being spun or stamped to provide cylindrical seats 19ª and 20ª for supporting a tire (not shown) upon the wheel. This form of wheel is similarly provided with a channelled annular base portion 23ª for spacing the disks of the wheel and cooperating with flanges 21ª and 22ª to provide a drop center rim for the tire.

Brake shoe 24 is operated against the internal surface of brake drum 15 by means of suitable mechanism (not shown) through shaft 25 passing through collar 26 affixed to shaft 11. In order to exclude water and other foreign matter from the interior of the brake a corrugated disk 27 secured to brake drum 15 extends radially inwardly to a zone adjacent collar 26 to form a loose joint therewith. This joint is provided with packing 28 held in position by nut 29 to maintain a watertight joint while permitting relative rotation of disk 27. A stuffing box 30 is provided about shaft 25 to prevent leakage where the latter passes through collar 26. The outer end of hub 10 is sealed from moisture by means of a hub cap 31 screwed on the hub. This waterproof construction is particularly adaptable for use on amphibian airplanes.

The wheel construction thus described permits of simple manufacture and affords a practical and easy method of riveting the disks, rim base and hub together. The design of the wheel produces a strong and secure construction using a minimum weight of material. All of the strain imparted from the tire to the wheel is taken up directly by the disks instead of being tranmitted thereto by a flanged rim. The construction of the wheel and brake protects the interior thereof from water, moisture and other foreign matter which would tend to render the same less efficient.

Modifications of the invention may be resorted to without departing from the spirit thereof or the scope of the appended claims.

What is claimed is:

1. A waterproof brake construction for wheels comprising an axle, a collar affixed to said axle, a brake drum relatively rotatable about said axle, a disk affixed to said brake drum for rotation therewith and having its inner peripheral portion adjacent said collar, and means mounted on said collar and engageable with opposite faces of said disk for sealing the joint between the inner peripheral portion of said disk and said collar.

2. A waterproof brake construction comprising an axle, a brake drum rotatable about said axle, a fixed collar surrounding said axle for partially housing the brake, and a closure member affixed to said brake drum and rotatable therewith the central portion of said disk being rotatable adjacent said collar, and a gasket mounted on said collar on each side of said member for spanning the opening between the closure member and said collar.

3. A brake construction comprising an axle, a brake drum rotatable about said axle, a cover plate fixed to said brake drum and rotatable therewith, and a pair of packing rings mounted in fixed relation to said axle, and engageable with the radially inner edge of said cover plate on opposite sides thereof to make a sealed joint.

4. A brake construction comprising an axle, a brake drum rotatable about said axle, and housing the brake mechanism, a cover plate fixed to said brake drum and rotatable therewith, a flange mounted in fixed relation to said axle, packing means retained on said flange engageable with the radially inner edge of said cover plate to make a sealed joint, and a shaft extending through said flange for actuating the brake mechanism.

In witness whereof I have hereunto affixed my signature this 16th day of January, 1929.

JOSEPH G. SWAIN.